Aug. 25, 1953

E. A. STALKER 2,650,060

GAS TURBINE ADAPTED AS A STARTER

Filed April 27, 1948

INVENTOR.
Edward A. Stalker

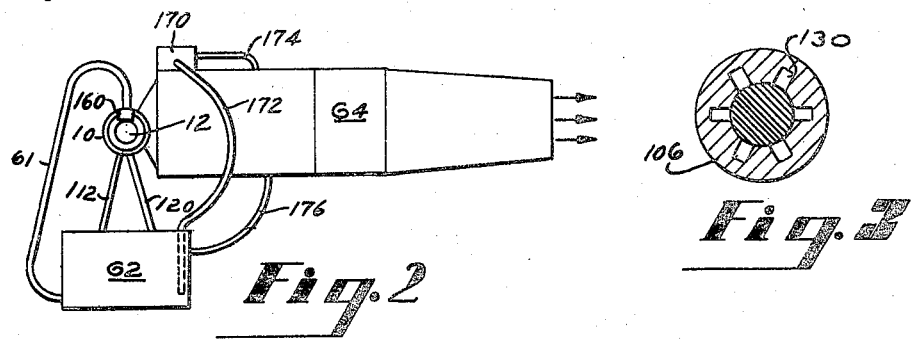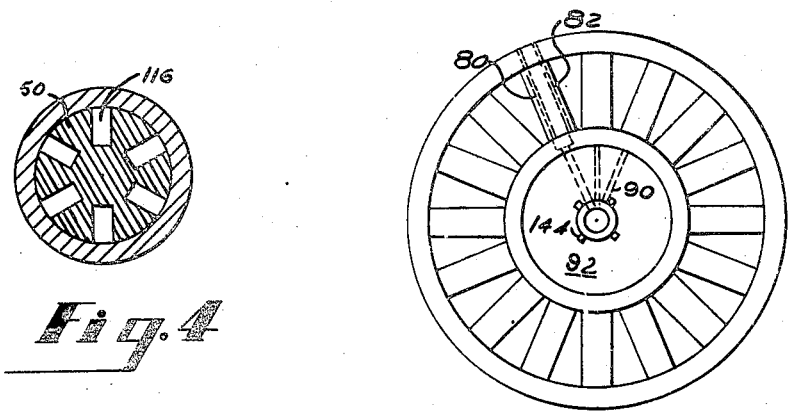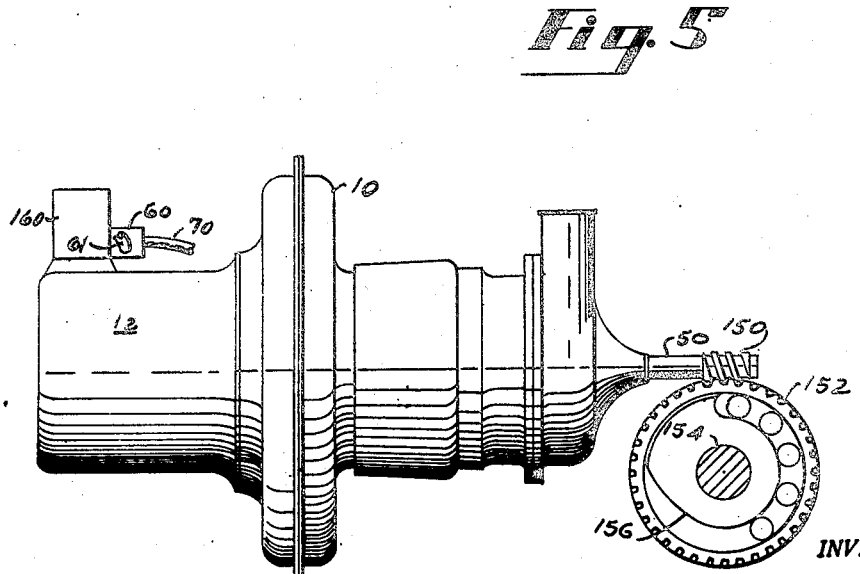

Patented Aug. 25, 1953

2,650,060

UNITED STATES PATENT OFFICE 2,650,060

GAS TURBINE ADAPTED AS A STARTER

Edward A. Stalker, Bay City, Mich.

Application April 27, 1948, Serial No. 23,433

3 Claims. (Cl. 253—39.15)

My invention relates to gas turbines for starting prime movers requiring starting power and particularly to gas turbines.

An object of my invention is to provide a small, relatively low price gas turbine.

Another object is to provide a novel means of cooling a starter gas turbine so that it can produce a large power output for its size.

Still another object is to provide a novel means of introducing a cooling liquid into turbine rotors;

Also another object is to provide a novel rotor construction adapted for the provision therein of cooling flow passages.

Another object is to provide a starter gas turbine for starting large gas turbines, the two turbines cooperating in the use of an auxiliary.

I accomplish the above objects by the means illustrated in the accompanying drawings in which—

Fig. 2 shows the starter turbine mounted on the main turbine it is to start, in relation to the lubricating oil tank for the main turbine;

Fig. 3 is a section along line 3—3 in Fig. 1;

Fig. 4 is a section along line 4—4 in Fig. 1;

Fig. 5 is an axial view of the stator structure; and

Fig. 6 is a view of the starter turbine with gearing and clutch for rotating the main turbine shaft.

Figure 1:
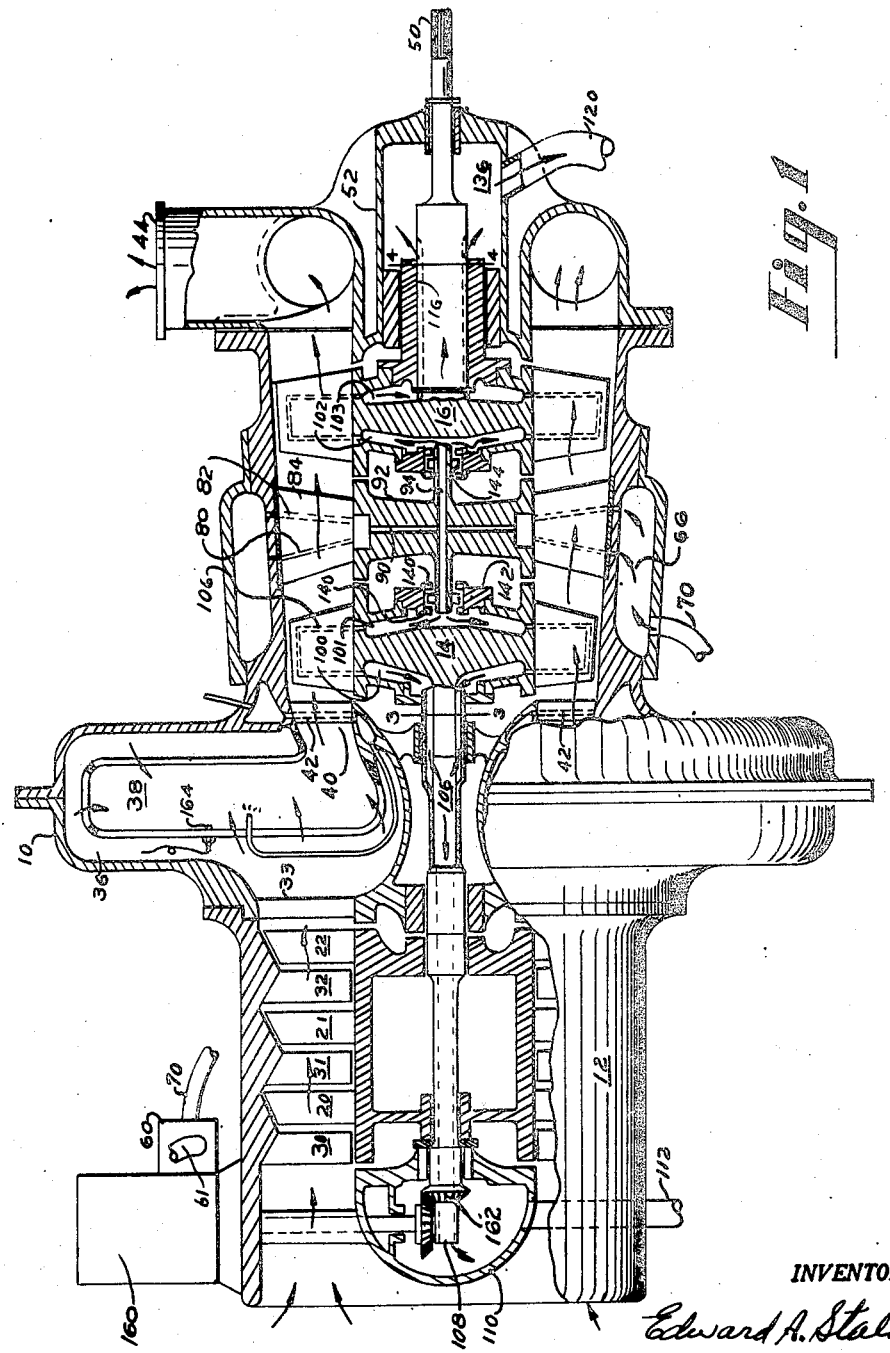
Fig. 1 is an axial section through the starter turbine.

Many prime movers require a starting torque to be applied to them in order to bring them to such a rate of rotation that they may begin to operate on their own power. Gas turbines are of this type where they produce the power to operate their own compressors.

Since the starter performs no useful function except to start the prime mover, it should not involve a large financial investment. Also in aircraft particularly it should not contribute a large weight increment to the power-plant.

A gas turbine as a starter presents the advantage of quickly attaining maximum power output but all contemporary turbines are too large and too costly to perform a starting service.

This invention teaches how a turbine may be constructed sufficiently small and at a low enough cost to be operable and practicable for use as a starter.

The power output for a given size turbine increases greatly with increase in inlet gas temperature. For instance if the gas inlet temperature is increased from 1500° F. to 2500° F. the power output of the turbine doubles. Existing turbines however are limited to a gas temperature of about 1500° at inlet to the turbine rotor.

Air cooling means do not permit a high enough operating temperature and the various schemes are impractical for very small turbines.

Simple liquid cooling means are unknown and if they required a radiator to dissipate the heat, they would prove impractical for a starter turbine.

The present invention incorporates the novel idea of using the lubricant for the prime mover as cooling fluid for the starter turbine. There is sufficient of this liquid that a great many starts may be made without unduly heating the lubricant. In fact the starter turbine would perform the useful function of heating the oil to the proper temperature for best functioning of the prime mover.

The starter turbine is arranged to pump oil out of the tank serving the prime mover for circulation through the starter turbine back to the tank. I prefer to use the oil of the lubricating system but it would also be practicable to use the fuel oil as well. The discussion of this invention is intended to cover the use of either or both fluids although for simplicity only one may be specifically referred to.

Referring now to the drawings the turbine is indicated generally as 10. Its compressor is 12 and the turbine rotors are 14 and 16.

The compressor has the rotor stages 20—22 and the stator stages 30—33. It compresses air as it flows axially along the machine.

The compressed air is discharged into the collection chamber 36 whence it flows into the combustor 38. The gas (products of combustion) passes into the annular passage 40 and is directed properly toward the turbine rotor 14 by the nozzle vanes 42. The gas passes through the rotors in succession and discharges from the exhaust passage 44.

The upstream or first turbine rotor 14 is connected to the compressor to drive it. The second or downstream turbine rotor 16 is mounted for independent rotation and has its shaft 50 extending outside the turbine case 52 to deliver power externally.

The blades of the turbine, particularly the rotor blades require cooling. This is accomplished by pumping oil through ducts in the blades. The pump 60 sucks oil via tube 61 from the oil tank 62 serving the main turbine 64 (see Fig. 2) and delivers the oil to the annular manifold 66 via tube 70. The oil flows from the manifold into the ducts 80 and 82 in the stator blades 84, thence by way of the radial ducts 90 in the stator web 92 to the web hub 94 which projects into the interiors of the rotors 14 and 16.

The oil in the recesses 100—103 of the rotors is forced by the pump and the centrifugal action in the rotors into the ducts 106 of the rotors. These ducts carry the cooling oil from the recess on one side to the recess on the other. For instance in rotor 14 the cooling oil flows from recess 101 to recess 100 and then into shaft 106 from which it is discharged at 108. It is collected in fairing 110 and returned to the oil tank via tube 112.

The cooling liquid of the rear rotor 16 has a similar course through the rotor and flows through grooves 116 in the shaft 50 to tube 120 which returns the liquid to the oil tank 62.

Each turbine rotor is comprised of a web about whose periphery is fixed a rim of channel section with the legs of the channel extending toward the axis of rotation. These legs form with the web, recesses for the containment of the cooling liquid. To the legs of the channel rim are fixed cover plates to bound the recesses in part and facilitate the introduction of cooling fluid into the recesses.

It is to be noted that the cooling liquid (oil) is introduced between the turbine rotors and each rotor receives cool oil. The oil does not flow from one rotor to the other which would give one rotor a hotter flow than the other.

As shown in Fig. 3 the shaft 106 has a plurality of holes 130 for conducting the liquid from recess 100 into the hollow interior of shaft 106.

As shown in Fig. 4 the grooves 116 in shaft 50 serve to conduct the cooling oil from recess 103 to the collecting chamber 136.

Fig. 5 shows a view of the stator 92 looking along the axis. Each blade has a duct 90 leading into the web hub 94.

Cooling liquid in the recesses is kept from escaping by the action of the rotating blades 140 fixed to the inner wall of the rotor cover 142. These blades cooperating with blades 144 form an axial flow pump always tending to force cooling oil back into the respective rotor. Other types of seals could also be used.

The introduction of the cooling liquid into the rotors from a locality between the rotors has the advantage that the gas pressure in the space between the rotors has a pressure comparable to the cooling liquid being introduced into the rotors. This reduces the tendency of the liquid to leak out into the space.

Although not shown suitable labyrinth seals and the like are to be used between the rotors and stator structure and the like to prevent gas leakage between stages.

Fig. 6 shows the gear connection of the starter turbine to the main turbine. The shaft 50 carries the worm gear 150 which is in mesh with the worm wheel 152. It is operably connected to the main turbine shaft 154 by the free wheeling clutch 156 within the worm wheel. Thus the starter can drive the shaft 154 but when the main turbine is started the starter turbine is automatically disconnected.

The starter turbine is started by the electric motor 160 served with electric power from a suitable source. This motor rotates the starter turbine shaft through the bevel gear train 162. At the time of starting current is also supplied to the igniter plug 164 to ignite the fuel in the combustion chamber 38.

It will be observed that, since the compressor and its associated rotor are independent of the power output rotor, the electric motor can spin the compressor even though the power output rotor is engaged to the shaft of the primary turbine and both are stationary.

It is also to be observed that the oil pump 68 is driven from the same rotor driving the compressor. Thus with the independent or power output rotor stationary oil is certainly circulated through both rotors to keep them cool.

Another feature is that when the starter turbine ceases to operate, the circulation of oil through the starter turbine is terminated.

The main turbine 64 may be serviced with the liquid (fuel or lubricating oil) in the tank 62 by means of a pump 170 drawing liquid through tube 172 and discharging it through tube 174. The return from the turbine is via tube 176.

While I have illustrated a specific form of this invention it is to be understood that I do not intend to limit myself to this exact form but intend to claim my invention broadly as indicated by the appended claims.

I claim:

1. In combination in a gas turbine having a gas flow passage, an upstream turbine rotor and an adjacent downstream turbine rotor, said rotors being independently mounted for independent rates of rotation, each said rotor having blades operable in said gas passage, each said rotor having an internal cooling flow passage means therethrough for the conduction of cooling liquid into and out of each said blade through the root end thereof, said cooling passage means having its inlet and exit in a said rotor spaced radially inward from the root ends of said blades, and liquid supply means positioned between said rotors operably connected to the rotor passages of each said rotor in parallel to supply a substantially independent flow of cooling liquid for each rotor, and seal means disposed between said liquid supply means and said rotor passage means to exclude said liquid from said gas flow passage, the tips of said blades being closed to radially outward flow of said liquid therefrom.

2. In combination in a gas turbine having a main flow passage for motive gas, a plurality of rotors disposed along the turbine axis with their blades in said passage to be rotated by said motive gas, each said rotor having an internal cooling passage means therethrough for the conduction of a cooling liquid, the tips of said blades being closed to the emission of said cooling liquid radially outward therefrom, said cooling passage means having its inlet and exit in a said rotor spaced radially inward from the roots of the rotor blades, a stator interposed between two said rotors with the stator blades in said main passage, said stator having an inner shroud ring forming with the hubs of the adjacent rotors a contained space whose gas pressure therein is of the order of the gas pressure in said main passage between said adjacent rotors, stationary duct means in said stator to conduct cooling liquid through the interior of said stator to a said rotor at a liquid pressure of the order of that in said space, conduit means connecting said duct means and said rotors adapted to transfer said liquid from said duct means to said rotor cooling passage and sealing means disposed between each of said rotors and said conduit means, to exclude said liquid from said main passage, said pressure relation serving to reduce leakage from said sealing means.

3. In combination in a gas turbine powerplant having a gas passage, a source of cooling fluid, at least two turbine rotors mounted in tandem for rotation about the turbine axis having blades operable in said gas passage, a stator having a plurality of stator blades positioned between said rotors, a said stator blade having a radial duct therethrough, each said turbine rotor having an internal cooling passage means therethrough for the conduction of a cooling fluid into and out of each said blade, and stationary conduit means connecting said radial duct and said rotor cooling passage means for conducting cooling fluid to said rotor passages of both said rotors, the tips of said blades being closed to the radially outward emission of said cooling fluid therefrom, said cooling passage having its inlet and exit in a said rotor spaced radially inward from the root ends of said blades, and sealing means disposed between said conduit means and said rotors to prevent the passage of cooling fluid into said gas passage.

EDWARD A. STALKER.

References Cited in the file of this patent

UNITED STATES PATENTS

| Number | Name | Date |
|---|---|---|
| 1,197,340 | Carlson | Sept. 5, 1916 |
| 1,331,765 | Heinze | Feb. 24, 1920 |
| 2,322,608 | Webster | June 22, 1943 |
| 2,369,795 | Planiol et al. | Feb. 20, 1945 |
| 2,399,046 | Larrecq | Apr. 23, 1946 |
| 2,435,836 | Johnson | Feb. 10, 1948 |
| 2,438,247 | Knudsen | Mar. 23, 1948 |
| 2,463,851 | Browne | Mar. 8, 1949 |

FOREIGN PATENTS

| Number | Country | Date |
|---|---|---|
| 134,605 | Great Britain | Nov. 4, 1919 |
| 436,709 | Great Britain | Oct. 16, 1935 |
| 491,738 | Germany | Feb. 12, 1930 |
| 726,545 | France | Mar. 7, 1932 |
| 781,057 | France | Feb. 18, 1935 |